United States Patent [19]

Schoch et al.

[11] Patent Number: 5,261,291
[45] Date of Patent: Nov. 16, 1993

[54] ERGONOMIC APPARATUS FOR CONTROLLING A VEHICLE

[76] Inventors: Paul T. Schoch, 1002 Rainbow Crest Dr.; Marvin G. Schoch, Jr., 1001 Rainbow Crest Dr., both of Fallbrook, Calif. 92028

[21] Appl. No.: 931,058
[22] Filed: Aug. 17, 1992
[51] Int. Cl.$^5$ ............................................. G05G 11/00
[52] U.S. Cl. ................................... 74/484 R; 74/523; 180/333; 192/1.52
[58] Field of Search ...................... 74/471, 484 R, 523, 74/485; 180/332, 333; 192/1.52

[56] References Cited

U.S. PATENT DOCUMENTS

| | | | |
|---|---|---|---|
| 2,931,244 | 4/1960 | Brewer | 192/1.52 X |
| 3,089,560 | 5/1963 | Priest | 180/77 |
| 3,117,649 | 1/1964 | Parton et al. | 180/77 |
| 3,275,093 | 9/1966 | Pawl | 180/77 |
| 3,442,149 | 5/1969 | Schwendenmann | 74/481 |
| 3,472,094 | 10/1969 | Lake et al. | 74/481 |
| 4,175,628 | 11/1979 | Cornell et al. | 180/333 X |
| 4,541,497 | 9/1985 | Riediger et al. | 180/6.48 |
| 4,559,844 | 12/1985 | Mor | 180/333 X |
| 4,726,441 | 2/1988 | Conley | 180/322 |
| 4,849,585 | 7/1989 | Vidican et al. | 74/484 R X |
| 4,947,948 | 8/1990 | Dückinghaus | 180/6.7 |
| 4,993,509 | 2/1991 | Howell | 180/333 |
| 5,038,887 | 8/1991 | Sousek | 180/329 |
| 5,042,314 | 8/1991 | Rytter et al. | 180/333 X |

*Primary Examiner*—Allan D. Herrmann
*Assistant Examiner*—David W. Laub

[57] ABSTRACT

An apparatus is provided for ergonomically controlling a vehicle. A vertical control stick provides acceleration, brake, and turn functions in the vehicle. The apparatus may include a pivotal attachment or a slidable attachment at the lower end of the stick to a fixed surface in the vehicle. The stick is restricted to movement along the line of direction of the vehicle, both forward and rearward, of a neutral stick position. A braking means is interconnected with the stick such that movement of the stick forward from the neutral stick position causes vehicle braking. Similarly, an acceleration means is interconnected with the stick such that movement of the stick rearward from the neutral stick position causes vehicle acceleration. A steering collar on the stick is included such that the collar may be manually rotated about the longitudinal axis of the stick in both clockwise and counterclockwise directions from a neutral collar position. Clockwise rotation of the collar away from the neutral collar position causes the vehicle to turn to the right, and counterclockwise rotation of the collar away from the neutral collar position causes the vehicle to turn to the left. A console is mounted on an upper end of the stick. The console has a control panel with a plurality of controls for thumb actuation so that a single hand can provide manual control of the stick, the collar, and the control panel. The controls may include turn signal controls, horn actuation controls, low-high headlight beam controls, windshield wiper controls, windshield washer controls, speed range controls, gear range selection controls, and the like. Status indicators are further included on the console to provide vehicle status information.

14 Claims, 5 Drawing Sheets

ERGONOMIC APPARATUS FOR CONTROLLING A VEHICLE

FIELD OF THE INVENTION

This invention relates generally to devices for controlling vehicles, and, more particularly, to a vehicle control stick for controlling multiple vehicular functions with one hand.

BACKGROUND OF THE INVENTION

Single handed control devices for vehicles are known in the prior art Typically, such devices control steering, braking, and acceleration, or some combination of these three basic vehicle functions. For example, U.S. Pat. No. 3,275,093 to Pawl on Sep. 27, 1966, illustrates a control handle with two degrees of freedom. Horizontal motion of the handle controls steering of the vehicle, while vertical motion of the handle controls acceleration and braking. However, such an apparatus protrudes dangerously from the dash board and, during a collision, can cause serious injury to the driver if the driver is forced into the handle upon impact. Further, such a handle device makes no provision for allowing all vehicle functions to be controlled i therefrom, making the device difficult to use when the driver needs to activate a control on the dash board while, at the same time, holding onto this type of device to control steering and vehicle speed.

Other prior art control devices suffer many similar drawbacks. The present inventors know of no prior art devices that combine all of the possible vehicle control functions on a single control handle. Moreover, no prior art device is ergonomically designed to allow easy manipulation of function controls with the same hand while simultaneously controlling steering, acceleration, and braking. Such a needed device would allow people without the use of other limbs to effectively and safely drive an automobile or similar vehicle, and would allow use with either the right or left hand. Further, such a needed device would not present a safety hazard to the driver in the event of a sudden stop, such as in a collision, for example. Further, such a needed device would urge steering into a straight direction, and would stop acceleration, in the event that the handle is released. Moreover, such a needed device could be used with a combination of electrical, hydraulic, or mechanical linkages to the various control actuators, thereby allowing flexibility in vehicle design. The present invention fulfills these needs and provides further related advantages.

SUMMARY OF THE INVENTION

The present invention is an ergonomic apparatus for controlling a vehicle, or the like. A vertical control stir-k provides acceleration, brake, and tum functions in the vehicle. The apparatus may include a pivotal attachment means or a slidable attachment means at the lower end of the stick for either pivotal attachment or slidable attachment of the stick to a fixed surface in the vehicle, such as a passenger compartment floor board. The stick is restricted to movement along the line of direction of the vehicle, both forward and rearward, of a neutral stick position. A braking means is interconnected with the stick such that movement of the stick forward from the neutral stick position causes vehicle braking. Similarly, an acceleration means is interconnected with the stick such that movement of the stick rearward from the neutral stick position causes vehicle acceleration.

A steering means provides a rotatable collar on the stick such that the collar may be manually rotated about the longitudinal axis of the stick in both clockwise and counterclockwise directions from a neutral collar position. Clockwise rotation of the collar away from the neutral collar position causes the vehicle to turn to the right. Similarly, counterclockwise rotation of the collar away from the neutral collar position causes the vehicle to tum to the left.

A console may be optionally mounted on an upper end of the stick. The console has a control panel with a plurality of control means for thumb actuation so that a single hand can provide manual control of the stick, the collar, and the control panel. The control means may include turn signal control means, hom actuation control means, low-high headlight beam control means, windshield wiper control means, windshield washer control means speed range control means, gear range selection control means, and the like. Status indicators may be further included on the console for providing turn signal status, headlight beam status, speed status, oil pressure status, coolant temperature status, seat belt conditioner status, speed range status, gear range status, and the like.

The present invention combines all of the possible vehide control functions on a single control handle is ergonomically designed to allow easy manipulation of function controls with the same hand that simultaneously controls steering, acceleration, and braking. The present invention allows people, including those without the use of other limbs, to effectively, easily, and safely drive an automobile or similar vehicle with one hand. Further, the present invention increases safety to the driver in the event of a sudden stop, such as in a collision, by not presenting a protruding handle toward the driver's body. Still further, the present invention urges steering to return to a straight direction, and stops acceleration, in the event that the handle is released. The present invention can be used with a combination of electrical, hydraulic, or mechanical linkages to various control actuators for steering, braking, and acceleration, thereby allowing flexibility in vehicle design. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
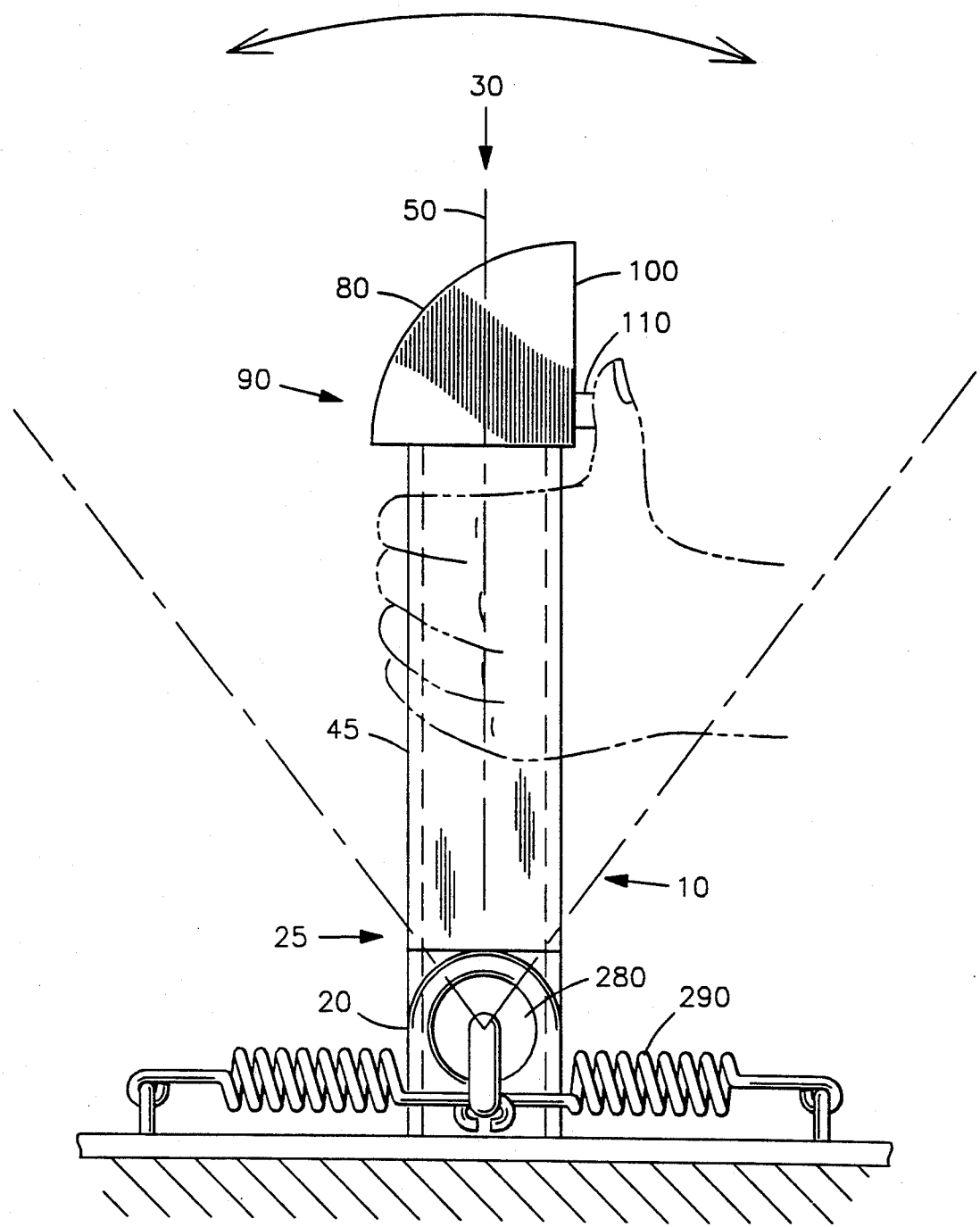
FIG. 1 is a right side elevational view of the invention, illustrating a hand in phantom outline grasping a control stick of the invention.
Figure 2A:
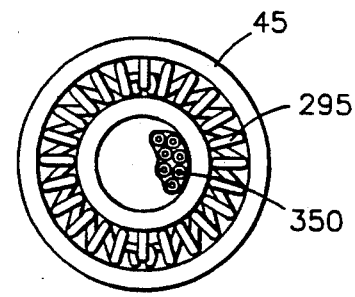
FIG. 2A is a partial cross sectional view of the invention, taken generally along lines 2A—2A of FIG. 2, illustrating a second urging means for urging a collar towards a neutral collar position.
Figure 2:
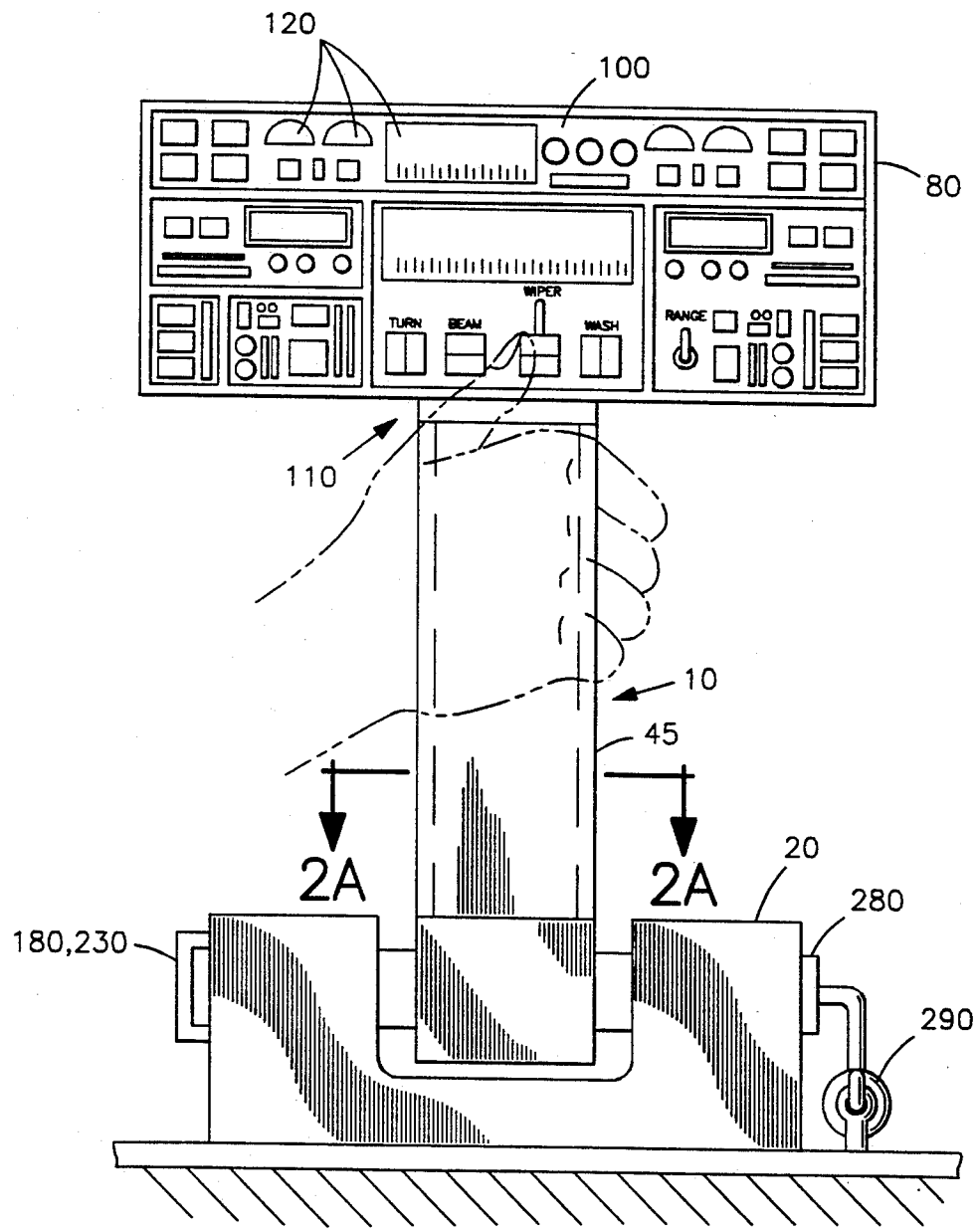
FIG. 2 is a front elevational view of the invention, illustrating the control stick of FIG. 1 and a control console located thereon.

FIGS. 1 and 2 show an ergonomic apparatus for controlling a vehicle, or the like. A vertical control stick 10 provides, at a minimum, acceleration, brake, and turn functions in the vehicle. One embodiment of the invention includes a pivotal attachment means 20 at the lower end 25 of the stick 10 for pivotal attachment to a fixed surface in the vehicle, such as a passenger compartment floor board, or the like. The pivotal attachment means 20 may include at least one horizontally oriented pivot pin 280 for pivotal rotation of the stick 10. The stick 10 is restricted to movement along the line of direction of the vehicle, both forward and rearward, of a neutral stick position 30. Preferably, the apparatus further includes a first urging means 290 for urging the stick 10 towards the neutral stick position 30. The first urging means 290 may be a pair of springs, as illustrated in FIG. 1, or may be other suitable urging means. The stick 10 is preferably manufactured from a rigid material, such as a metal alloy. Clearly, however, stick 10 may also be manufactured from a combination of rigid and semi-rigid materials such that the stick 10 is comfortable to hold for extended periods of time. Further, in the event of a collision or the like, the stick 10 will give way so as not to cause injury to a person colliding therewith.

Figure 4:
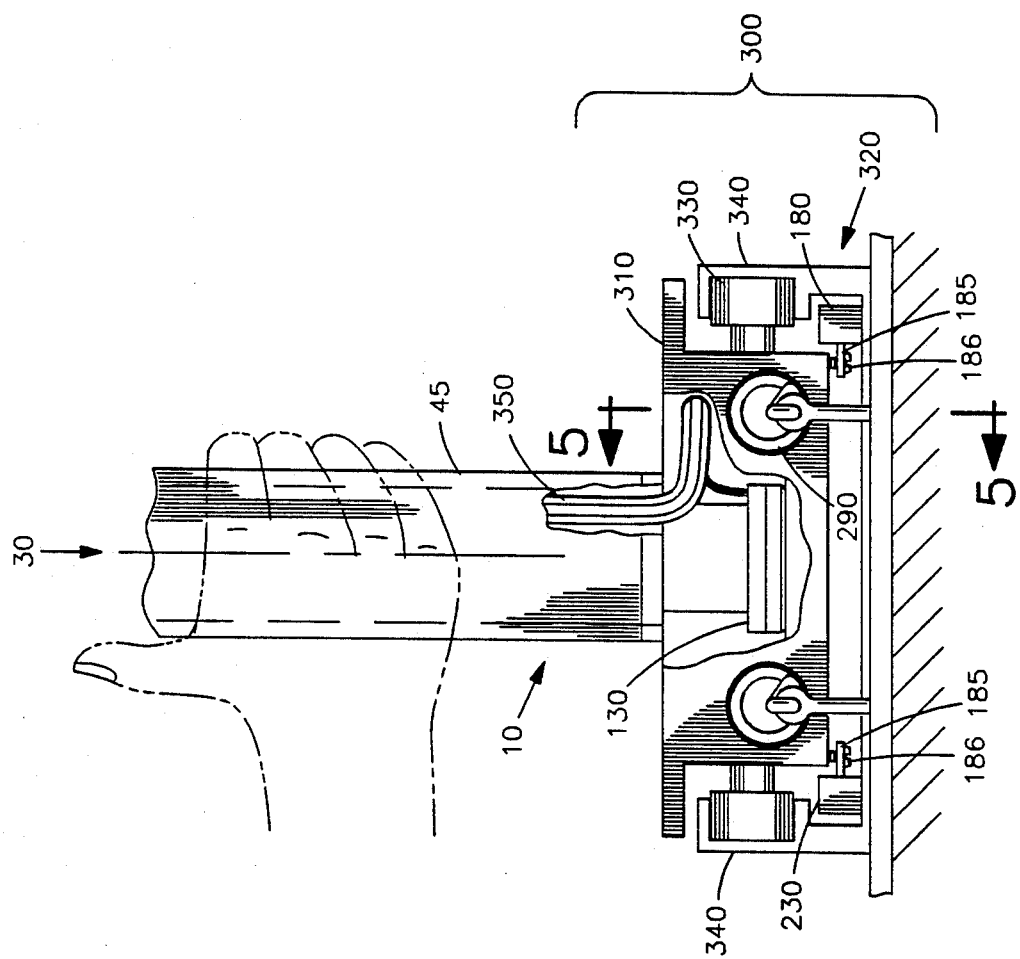
FIG. 4 is a front elevational view of an alternate embodiment of the invention, illustrating a slidable attachment means of the control stick, and a collar position sensor.
Figure 5:
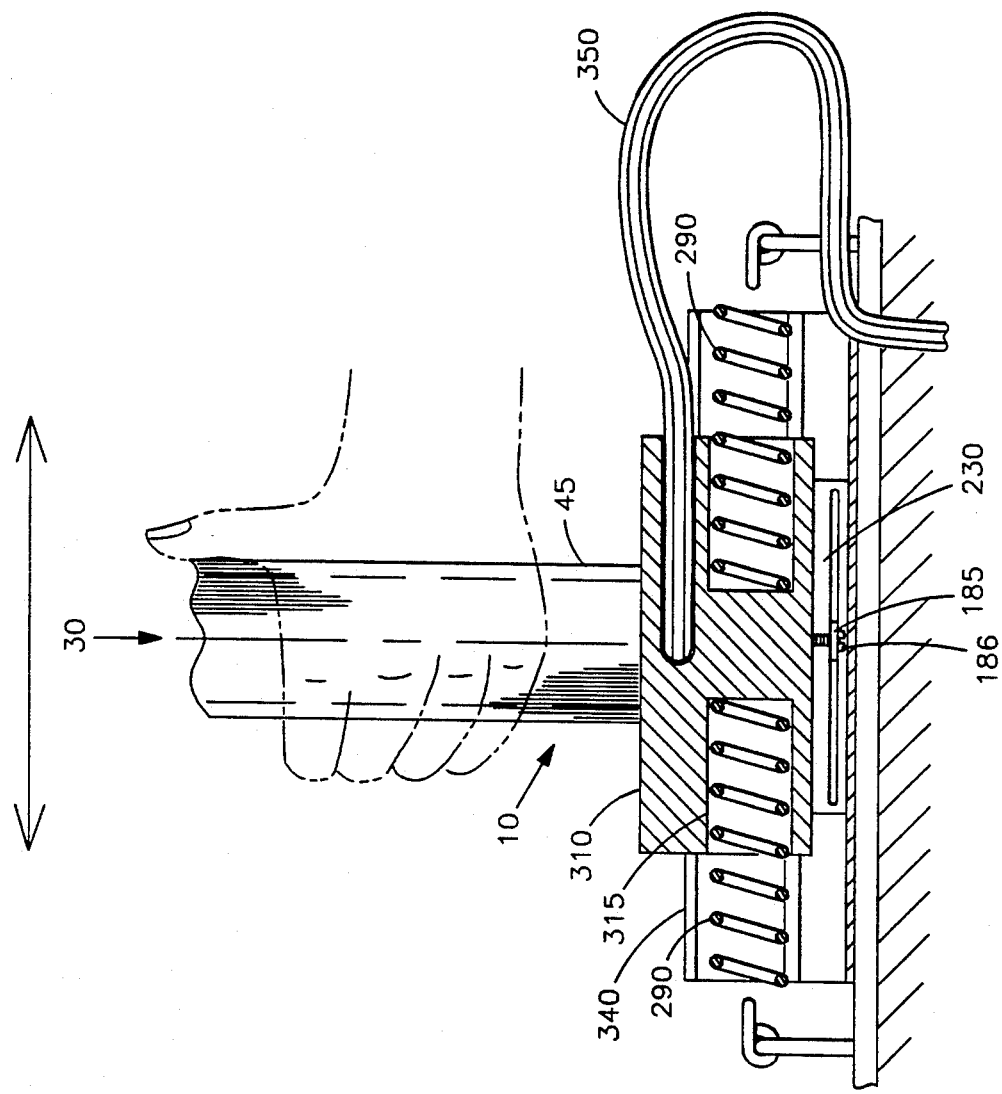
FIG. 5 is a cross sectional view of the invention, taken generally along lines 5—5 of FIG. 4, illustrating a first urging means for urging the control stick into a neutral control stick position.

An alternate embodiment of the invention, illustrated in FIGS. 4 and 5, includes a slidable attachment means 300 for slidable attachment of the stick 10 to the fixed surface of the vehicle. Preferably, the slidable attachment means 300 includes a carrier assembly 310 fixed to the lower end of the stick 10, and a track assembly 320 fixed to the fixed surface in the vehicle. The carrier assembly 310 includes bearing means 330, fixed on opposing sides of the carrier assembly 310, that slidably engage a pair of opposing tracks 340 on the track assembly 320. A flexible conduit 350 is included, one end of which is attached to the carrier assembly 310 and the other end of which is attached to the fixed vehicle surface. The flexible conduit 350 allows the carrier assembly 310 to move freely along the track assembly 320, and may contain wires, control cables, and the like. The first urging means 290' of such an alternate embodiment may comprise two opposing pairs of springs, as illustrated in FIG. 5, and corresponding carrier cavities 315. Such an urging means 290' urges the stick 10 into the neutral stick position 30. Preferably, the slidable attachment means 300 is manufactured from a rigid metal material, with bearing means 330 and tracks 340 being of conventional type.

In the preferred embodiment of the invention, a braking means 70 is interconnected with the stick 10 such that movement of the stick 10 forward from the neutral stick position 30 causes vehicle braking, with the braking force being proportional to the magnitude of movement of the stick 10 away from the neutral stick position 30. Similarly, an acceleration means 75 is interconnected with the stick 10 such that movement of the stick 10 rearward from the neutral stick position 30 causes vehicle acceleration, with the accelerating force being proportional to the magnitude of movement of the stick 10 away from the neutral stick position 30. Alternate embodiments of the invention might dictate that the degree of braking and acceleration is non-linear with respect to the magnitude of movement of the stick 10 away from the neutral stick position 30.

In the preferred embodiment of the invention, if the operator of the vehicle needs to make a sudden emergency stop, for example, the inertia of the stick 10 during deceleration of the vehicle further moves the stick 10 forward, thereby adding to the braking effect. In an alternate embodiment of the invention, on the other hand, the braking means 70 and the acceleration means 75 are interchanged such that vehicle braking occurs when the stick 10 is moved rearward of the neutral position 30 and acceleration occurs when the stick 10 is moved forward of the neutral position 30. In such an alternate embodiment, the inertia of the stick 10 in a sudden deceleration causes the stick 10 to move toward the neutral position 30, thereby causing less braking force to be applied. Other embodiments would be obvious to one skilled in the art.

Figure 3:
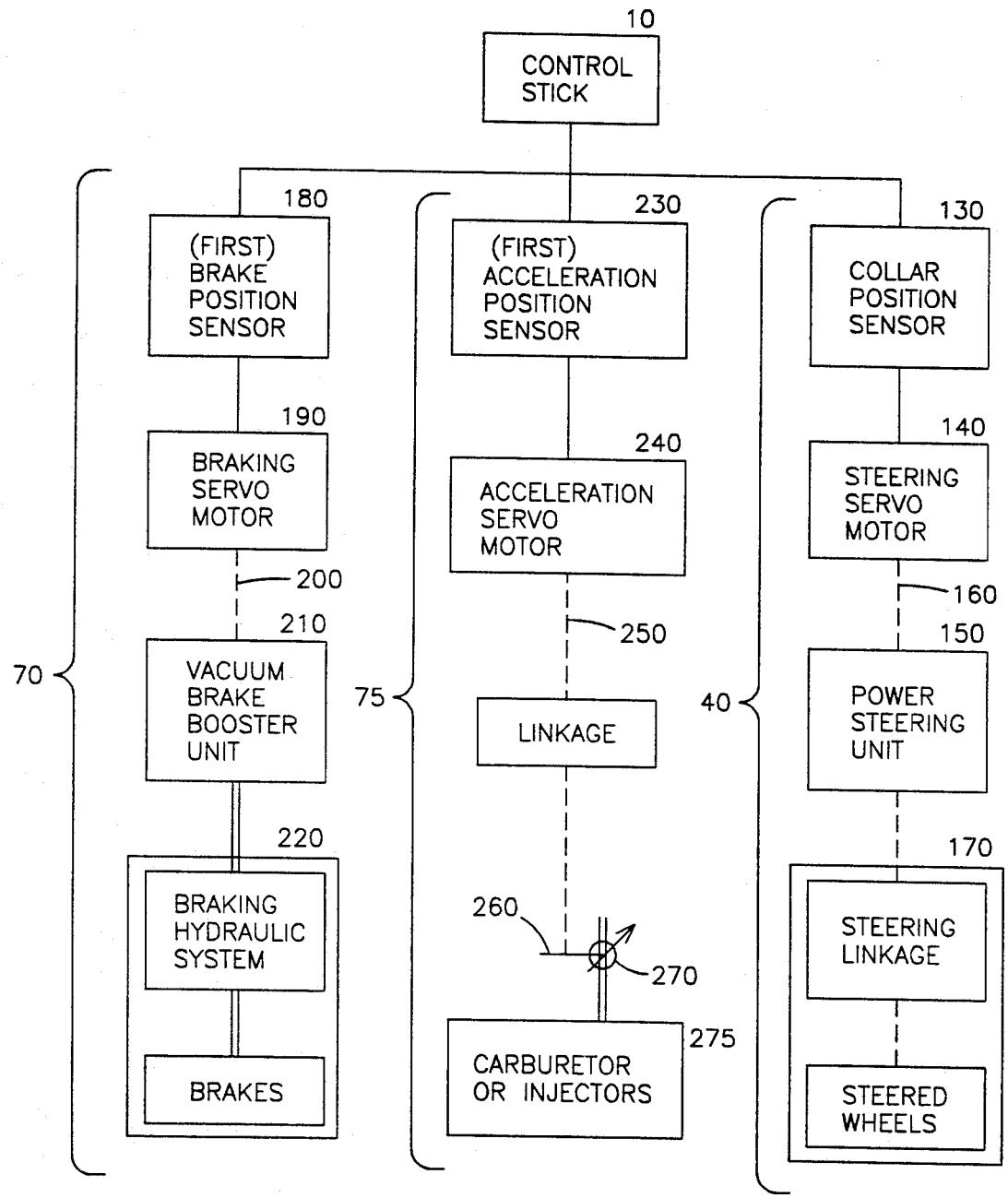
FIG. 3 is a schematic diagram of the invention, illustrating the elements of a braking means, an acceleration means, and a steering means of the invention.

A steering means 40 provides a rotatable collar 45 on the stick 10 such that the collar 45 may be manually rotated about the longitudinal axis 50 of the stick 10 in both clockwise and counterclockwise directions from a neutral collar position 60 (FIGS. 1 and 3). Preferably, the apparatus includes a second urging means 295 for preferentially holding the collar 45 at the neutral collar position 60 and for urging the collar 45 back to the neutral position 60 when the collar 45 is not in the neutral position 60. The second urging means 295 may be two springs mounted in opposing arcs, each spring being mounted at one end to the collar 45 and at the other end to the stick 10 (FIG. 2A), or other suitable urging means. Clockwise rotation of the collar 45 away from the neutral collar position 60 causes the vehicle to turn to the right. Similarly, counterclockwise rotation of the collar 45 away from the neutral collar position 60 causes the vehicle to turn to the left. In the preferred embodiment of the invention, the degree of the right and left turning is proportional to the magnitude of rotation of the collar 45 away from the neutral collar position 60. Alternate embodiments of the invention cause the degree of the right and left turning to be non-linear with respect to the magnitude of rotation of the collar 45 away from the neutral collar position 60.

An electronic collar position sensor 130 (FIG. 4) is included for sensing the position of the collar 45 and for producing an electrical servo voltage in proportion to the position of the collar 45. A steering servomotor 140 is further included in the steering means 40 for receiving the servo voltage and for providing a torque to a first shaft 160 of the steering servomotor 140 (FIG. 3). The first shaft 160 is, in turn, connected to a power steering unit 150 for turning a steering linkage 170 in the vehicle, such that the vehicle may be steered by rotating the collar 45. In one embodiment of the invention, the electronic collar position sensor 130 is a potentiometer transducer. Clearly, however, other types of position sensors 130 could be utilized, such as optical, magnetic, and the like, and one skilled in the art could readily choose other means of controlling vehicle steering through the electrical signals generated by the collar position sensor 130.

The braking means 70 of the apparatus further includes a first electronic stick position sensor 180 for sensing the position of the stick 10 and for producing an electrical servo voltage in proportion to the position of the stick 10 (FIGS. 2 and 3). A braking servomotor 190 is further included in the braking means 70 for receiving the servo voltage and for providing a torque to a second shaft 200 of the braking servomotor 190. The second shaft 200 drives a vacuum brake booster unit 210 for producing brake pressure to a braking hydraulic system 220 for braking the vehicle so as to provide deceleration (FIG. 3). Similarly, the acceleration means 75 of the apparatus further includes a second electronic stick position sensor 230 for sensing the position of the stick 10 and for producing an electrical servo voltage in proportion to the position of the stick 10. An acceleration servomotor 240 is further included in the acceleration means 75 for receiving the servo voltage and for providing a torque to a third shaft 250 of the acceleration servomotor 240. The third shaft 250 drives an acceleration linkage 260 for opening an orifice 270 in the fuel line of the vehicle to enrich the air to fuel ratio introduced into the carburetor 275 of the vehicle to provide vehicle acceleration. In one embodiment of the invention, the first and second electronic stick position sensors 180, 230 are potentiometer transducers. Referring now to the embodiment shown in FIG. 2, the first and second electronic stick position sensors 180,230 are round potentiometer transducers. In the embodiment of FIGS. 4 and 5, the first and second electronic stick position sensors 180,230 are linear potentiometer transducers, such that a wiper 185 is fixedly attached to the carrier assembly 310 with a screw means 186. As such, linear displacement of the carrier assembly 310 causes a proportional linear displacement of the wiper 185 within the position sensors 180',230', resulting in an electrical resistance proportional to the position of the stick 10. Clearly, alternate types of electronic position sensor 180, 180', 230, 230' could be utilized, such as optical, magnetic, and the like. Moreover, alternate acceleration means 75 and braking means 70 could also be devised without significantly deviating from the spirit and scope of the present invention. For example, movement forward or rearward of the stick 10 could be used to control acceleration, as opposed to directly controlling speed. In such an embodiment, when the stick 10 is in the neutral stick position 30, the vehicle maintains its present speed. Moving the stick 10 forward causes the present speed to be reduced by activating the braking means 70. Moving the stick 10 rearward causes the present speed to be increased by activating the acceleration mean 75.

A console 80 may be optionally mounted on an upper end 90 of the stick 10 (FIGS. 1 and 2). The console has a control panel 100 with a plurality of control means 110 for thumb actuation so that a single hand can provide manual control of the stick 10, the collar 45, and the control panel 100. The control means 110 may include turn signal control means, horn actuation control means, low-high headlight beam control means, windshield wiper control means, windshield washer control means speed range control means, gear range selection control means, and the like. Clearly, a variety of safety features may be incorporated into the control panel 100 without significantly departing from the spirit and scope of the invention, such as means for disabling selection of park or reverse gears while the vehicle is moving in a forward direction, and the like. Status indicators 120 may be further included on the console 80 for providing turn signal status, headlight beam status, speed status, oil pressure status, coolant temperature status, seat belt conditioner status, speed range status, gear range status, and the like. Such status indicators 120 are positioned such that they are not blocked by a person's hand or arm while the person is grasping the control stick 10.

While the invention has been described with reference to several preferred embodiments, it is to be clearly understood by those skilled in the art that the invention is not limited thereto. For example, other vehicle functions might be controlled through the present invention, such as vehicle radio controls, environmental controls such as air conditioning, cellular telephone controls, and the like. Further, various safety features may be incorporated into the overall design of a vehicle utilizing the present invention, such as redundant electrical and hydraulic actuation systems and redundant electrical position sensors 130, 180, 180', 230. Thus, the scope of the invention is to be interpreted only in conjunction with the appended claims.

I claim:

1. An ergonomic apparatus for controlling a vehicle comprising an approximately vertical control stick providing acceleration, brake and turn functions in the vehicle and including means for attachment of the lower end of the stick to a fixed surface in the vehicle such that the stick is restricted to movement along the line of direction of the vehicle both forward and rearward of a neutral stick position, means for steering the vehicle providing a rotatable collar on the stick such that the collar may be manually rotated about a longitudinal axis of the stick in both clockwise and counterclockwise senses from a neutral collar position, a braking means and an acceleration means interconnected with the stick such that said movement forward of the neutral stick position causes vehicle braking, the braking force being proportional to the magnitude of stick movement, said movement rearward of the neutral stick position causes vehicle acceleration, the accelerating force being proportional to the magnitude of stick movement, said collar rotation clockwise of the neutral collar position causes vehicle turning to the right side, said collar rotation counterclockwise of the neutral collar position causes vehicle turning to the left side, the degree of the right and left side turning being proportional to the magnitude of rotation of the collar.

2. The ergonomic apparatus for controlling a vehicle of claim 1 further including a console mounted on the upper end of the stick, the console having a control panel with a plurality of control means for thumb actuation so that one hand can provide manual control of the stick, the collar and the control panel.

3. The ergonomic apparatus for controlling a vehicle of claim 2 wherein the control means includes turn signal control means, horn actuation control means, low-high headlight beam control means, windshield wiper control means, and windshield washer control means.

4. The ergonomic apparatus for controlling a vehicle of claim 2 wherein the console includes vehicle status indicators taken from the set of; turn signal status, headlight beam status, speed status, oil pressure status, coolant temperature status, seat belt status, door closure status, alarm system status and air conditioner status.

5. The ergonomic apparatus for controlling a vehicle of claim 1 wherein the steering means further includes an electronic collar position sensor for sensing the position of the collar and for producing an electrical servo voltage in proportion thereto, a steering servomotor for receiving the servo voltage and for providing a torque to a shaft therein, a power steering unit for turning a steering linkage in the vehicle to provide steering of the vehicle.

6. The ergonomic apparatus for controlling a vehicle of claim 1 wherein the braking means further includes a first electronic stick position sensor for sensing the position of the stick and for producing an electrical servo voltage in proportion thereto, a braking servomotor for receiving the servo voltage and for providing a torque to a shaft therein, a vacuum brake booster unit for producing brake pressure to a braking hydraulic system for braking the vehicle to provide deceleration.

7. The ergonomic apparatus for controlling a vehicle of claim 1 wherein the accelerating means further include a second electronic stick position sensor for sensing the position of the stick and for producing an electrical servo voltage in proportion thereto, an acceleration servo motor for receiving the servo voltage and for providing a torque to a shaft therein, an acceleration linkage for opening an orifice in the fuel line of the vehicle to enrich the air to fuel ratio introduced into the carburetor to provide vehicle acceleration.

8. The ergonomic apparatus for controlling a vehicle of claim 1 wherein the means for attachment of the lower end of the stick includes at least one horizontally oriented pivot pin for pivotal rotation of the stick.

9. The ergonomic apparatus for controlling a vehicle of claim 1 wherein the means for attachment includes a carriage assembly fixedly attached to the lower end of the stick, the carriage assembly slidably engaged with a track assembly, the track assembly fixedly attached to the fixed surface of the vehicle, for slidably movement of the stick.

10. The ergonomic apparatus for controlling a vehicle of claim 9 wherein the carrier assembly further including a pair of bearing means fixed on opposing sides of the carrier assembly, and the track assembly further includes a pair of opposing tracks, for slidable engagement of the carrier assembly on the track assembly.

11. The ergonomic apparatus for controlling a vehicle of claim 9 wherein a flexible conduit is attached at one end to the carrier assembly and at the other end to the track assembly, whereby the carrier assembly is free to move along the track assembly without obstruction by the conduit.

12. The ergonomic apparatus for controlling a vehicle of claim 1 further including first urging means for preferentially holding the stick at the neutral stick position and for urging the stick back to the neutral position when the stick is moved away from the neutral position.

13. The ergonomic apparatus for controlling a vehicle of claim 1 further including second urging means for preferentially holding the collar at the neutral collar position and for urging the collar back to the neutral position when the collar is moved away from the neutral position.

14. The ergonomic apparatus for controlling a vehicle of claim 1 wherein the first and second stick position sensors and the collar position sensor are all potentiometers.

* * * * *